United States Patent
Sells

[15] 3,672,088
[45] June 27, 1972

[54] FISHING SINKER

[72] Inventor: Russell E. Sells, 1331 N.E. Marine Drive, Portland, Oreg. 97211

[22] Filed: Sept. 17, 1969

[21] Appl. No.: 858,720

[52] U.S. Cl. .................................................. 43/44.97
[51] Int. Cl. ........................................................ A01k 95/00
[58] Field of Search .................................... 43/44.97, 43.1

[56] References Cited

UNITED STATES PATENTS

| | | | |
|---|---|---|---|
| 3,461,596 | 8/1969 | Green | 43/43.1 |
| 2,086,457 | 7/1937 | Zielesch | 43/44.97 X |
| 3,318,037 | 5/1967 | Harrison et al. | 43/44.97 X |
| 3,466,788 | 9/1969 | Potter | 43/44.97 X |

Primary Examiner—Samuel Koren
Assistant Examiner—Daniel J. Leach
Attorney—Eugene D. Farley

[57] ABSTRACT

A fishing sinker comprises an elongated sealed cylinder having secured in its bottom end a weight of predetermined magnitude. The upper end of the capsule is buoyant. When the sinker is immersed in water the net effect is to maintain it in a substantially upright position. Attaching means is provided at the upper end of the capsule for attaching both the rod line and the hook line. Accordingly, when the sinker with attached hook are drawn through the water, or allowed to rest on the bottom of a stream of water where there is current flow, the fish hook tends to be elevated slightly above the bottom and the danger of snagging both sinker and fish hook are minimized.

1 Claim, 4 Drawing Figures

PATENTED JUN 27 1972 3,672,088

RUSSELL E. SELLS
INVENTOR.

BY Eugene D. Farley
ATTY.

FISHING SINKER

This invention relates to fishing sinkers. It pertains particularly to sinkers used in sport fishing on the ends of lines which are cast or pulled under conditions such that the sinker, and associated hook, from time to time come in contact with the bottom of the body of water.

When fishing in streams and lakes using conventional sport fishing equipment, it is a common occurrence for the sinker or hook to become snagged on the bottom, or fouled on an obstruction. This occurs with particular frequency when the bait is being fished on the bottom and subsequently is retrieved. The retrieving motion tends to drag the hook along the bottom, snagging it on the intervening obstructions.

It is a general purpose of the present invention to provide a fishing sinker of simple and economical design in which the tendency to snag and foul on the bottom is reduced to a minimum.

Figure 1:
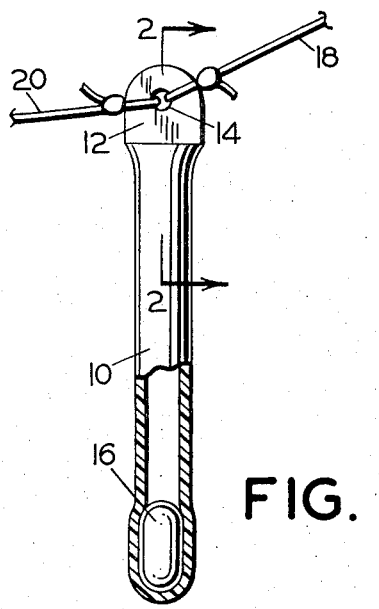
FIG. 1 is a view in side elevation partly in section illustrating the construction of the fishing sinker.
Figure 2:
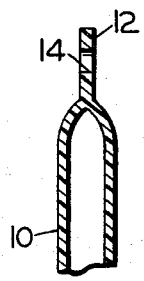
FIG. 2 is a fragmentary longitudinal sectional view taken along line 2—2 of FIG. 1.
Figure 3:
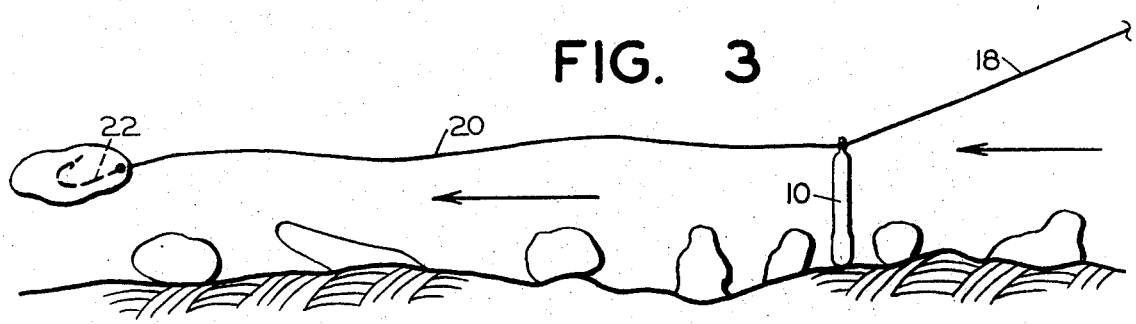
FIGS. 3 and 4 are views of typical applications of the fishing sinker attached to a fishing line and illustrating further its action in preventing snagging of the sinker and the associated hook when being fished and retrieved, respectively.
Figure 4:
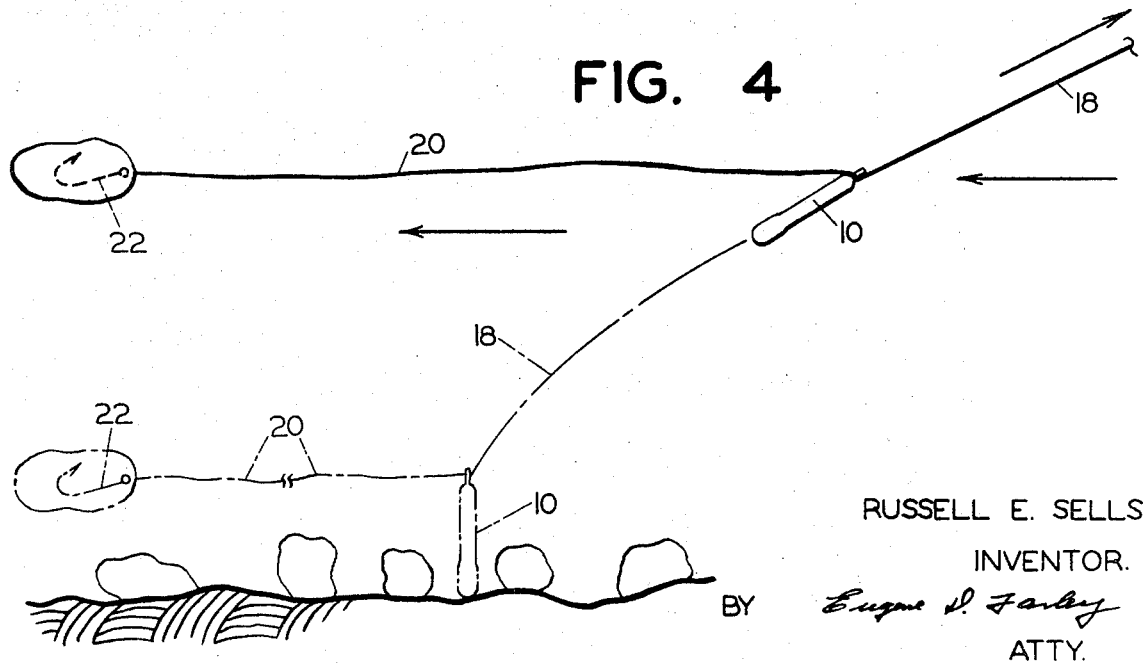

The fishing sinker of our invention includes a capsule or cylinder 10 having a length of, for example, from 3 to 4 inches. The capsule is sealed hermetically at both ends. It may conveniently be manufactured from a plastic tube by sealing off its bottom end and flattening its upper end to provide a flat segment 12 having a transverse perforation 14. In the alternative, the capsule may be molded from a suitable plastic.

A weight 16 is anchored in the bottom end of the capsule. Where the latter comprises a plastic tube, the weights may be anchored in place conveniently by pressing them into the tube, so that they frictionally engage the tube side walls.

The upper part of the capsule is filled with air and is buoyant. The ratio of the buoyancy to weight is predetermined to provide a net sinking effect of the desired magnitude. A series of sinkers thus may be carried by the fisherman, each having a different net weight, so that he may select a sinker having a weight suitable for a given fishing situation.

Means is provided for attaching the fishing lines to the sinker. Two such lines necessarily must be present, one line 18 leading to the rod and the other line 20 leading to a fish hook 22 or other fishing lure.

In the illustrated form of the invention the attaching means employed for this purpose comprises the perforation or eye 14 present in the flat end 12 of the sinker. Using this perforation it is a simple matter to tie the lines to the sinker using swivels or other associated equipment as required to complete the assembly.

When the sinker-hook assembly is immersed in water, the buoyant upper end of the sinker tends to maintain it in an upright position. When the assembly rests on, or is drawn across, the bottom of the body of water being fished, the sinker becomes a spacing member which tends to space the hook or lure upwardly from the bottom.

This has a dual effect. First it tends to minimize snagging of the hook or lure on an obstruction. Secondly, it tends to minimize snagging of the sinker itself.

This is particularly true during retrieving of the sinker-hook assembly. As soon as the fisherman reels in line 18, the buoyant effect of the sinker immediately elevates both sinker and hook so that danger of fouling is reduced. In the absence of such an arrangement, and as is well known, retrieving of line 18 drags both sinker and hook across the bottom for a short distance, increasing correspondingly the danger of snagging one or the other.

Having thus described my invention in preferred embodiments, I claim:

1. A fishing sinker consisting essentially of:
   a. an elongated tube of flexible plastic material closed at both ends to form a sealed capsule,
   b. a weight of larger diameter than the tube bore pressed into the latter and retained frictionally against the bottom sealed end thereof,
   c. a portion of the capsule above the weight being filled with air and buoyant,
   d. the magnitude of the weight being predetermined to overcome the buoyancy of the air-filled upper portion,
   e. the upper end portion of the tube being sealed flat and provided with a transverse opening for reception and attachment of a first length of fishing line connected to a fish hook and a second length of fishing line connected to a fish rod,
   f. the sinker accordingly tending to assume an upright position when immersed in water,
   g. the external surface of the bottom sealed end of the tube being unobstructed, whereby to prevent snagging of the sinker on submerged objects.

* * * * *